Patented Oct. 29, 1929

1,733,462

UNITED STATES PATENT OFFICE

WALTER KROPP, OF ELBERFELD, GERMANY, ASSIGNOR TO WINTHROP CHEMICAL COMPANY, INC., OF NEW YORK, N. Y., A CORPORATION OF NEW YORK

NEW BASIC OXIME ETHERS OF CYCLIC COMPOUNDS

No Drawing. Application filed August 25, 1927, Serial No. 215,525, and in Germany September 23, 1926.

The present invention relates to new basic oxime ethers of cyclic compounds, more particularly to cyclic compounds being substituted by the group:

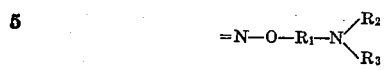

wherein $R_1$ stands for an alkylene ($C_nH_{2n}$) group and $R_2$ and $R_3$ stand for alkyl groups.

The new compounds are obtainable for instance by causing a salt of the oxime of a cyclic compound to be acted upon by an aminoalkylhalogenide, such as diethyl-aminoethylchloride. I prefer to carry out this process in the presence of a solvent while heating on the water bath.

The new compounds possess valuable pharmaceutical properties. They can be employed for instance by subcutaneous injections without any accompanying irritant effect. Their hydrochlorides are easily soluble in water.

The following examples will serve to illustrate the invention, all parts being by weight:—

*Example 1.*—To a solution of 2.3 parts sodium in dry alcohol 11.3 parts cyclohexanone-oxime and 14 parts diethylaminoethylchloride are added. The whole is heated on the water-bath for some hours, filtered from the common salt produced and the alcoholic filtrate evaporated. After being rendered alkaline with normal caustic soda lye the solution is extracted with ether. After evaporation of the ether the new base is distilled. It boils at 135° C. under 15 mm. pressure, and has most probably the formula:

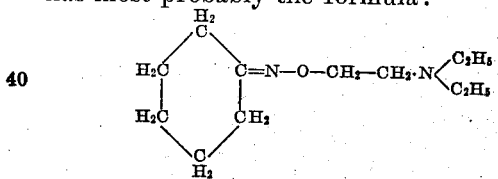

Its hydrochloride is very soluble in water. After recrystallization from ethyl acetate and ether it has a melting point of 95° C.

*Example 2.*—2.3 parts sodium are dissolved in dry alcohol, 16.7 parts camphor oxime and 14 parts diethylaminoethyl-chloride are introduced and the whole is boiled for several hours on the water-bath. After filtration the alcoholic lye is evaporated, the residue is treated with alkali, extracted with ether and after the evaporation of the ether distilled. The resulting ether boils at 150 to 160° C. under 14 mm. pressure. It has most probably the formula:

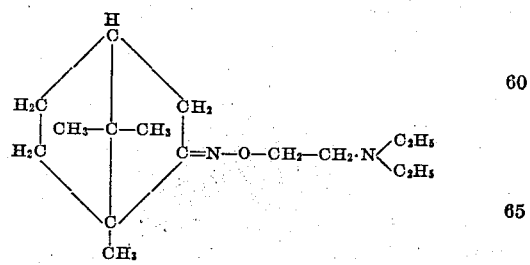

For the manufacture of the hydrochloride the base is neutralized with alcoholic hydrochloric acid and precipitated with ether. The hydrochloride is very easily soluble in water and alcohol and difficultly soluble in ether. It melts at 172° C. The salt has the tendency of retaining solvent, whereby the melting point may be reduced. Other amino alkyl halogenides can obviously be employed instead of diethyl amino ethyl chloride.

*Example 3.*—23 parts sodium are dissolved in alcohol, 151 parts anisaldoxime and 140 parts diethylaminoethylchloride are added and the whole is boiled. The reaction is complete in 1–2 hours. After filtration the alcohol is evaporated, the residue extracted with ethyl acetate and alcoholic hydrochloric acid is added until neutralization is effected. The hydrochloride thus precipitated is washed with ether. It is easily soluble in water with a neutral reaction and has a melting point of 145° C. The free base has most probably the formula:

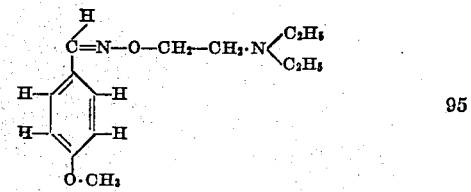

Having now particularly described and ascertained the nature of my said invention and in what manner the same is to be performed I declare that what I claim is:

1. As new products the cyclic compounds substituted by the group:

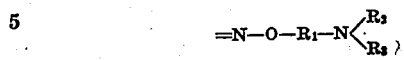

wherein $R_1$ stands for an alkylene group and $R_2$ and $R_3$ stand for alkyl groups.

2. As new products the cyclic compounds substituted by the group:

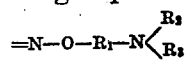

wherein $R_1$ stands for an alkylene group and $R_2$ and $R_3$ stand for alkyl groups of the methane series containing not more than two carbon atoms.

3. As new products the cyclic compounds substituted by the group:

4. As a new product the compound of the formula:

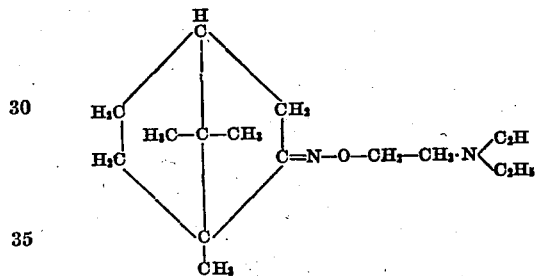

boiling under 14 mm. pressure at 150 to 160° C. and forming a hydrochloride with the melting point of 172° C.

In testimony whereof I have hereunto set my hand.

WALTER KROPP.